Oct. 20, 1959     L. T. THURLBY ET AL     2,909,668
RADIATION DETECTION AND INDICATING DEVICES
Filed June 4, 1958     2 Sheets-Sheet 1
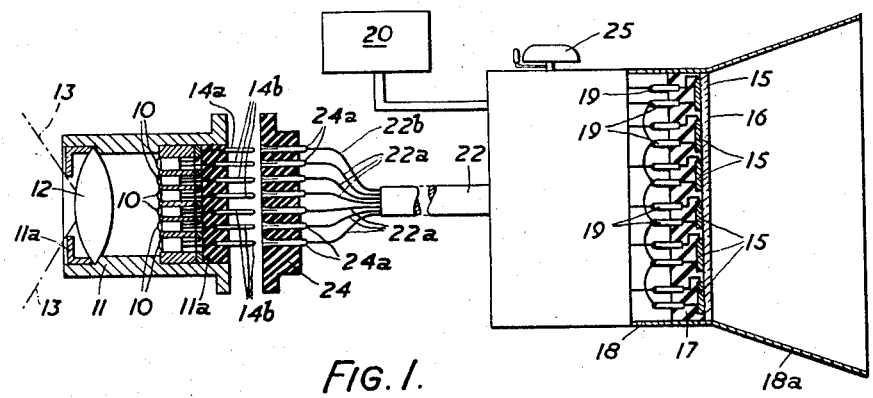
FIG. 1.
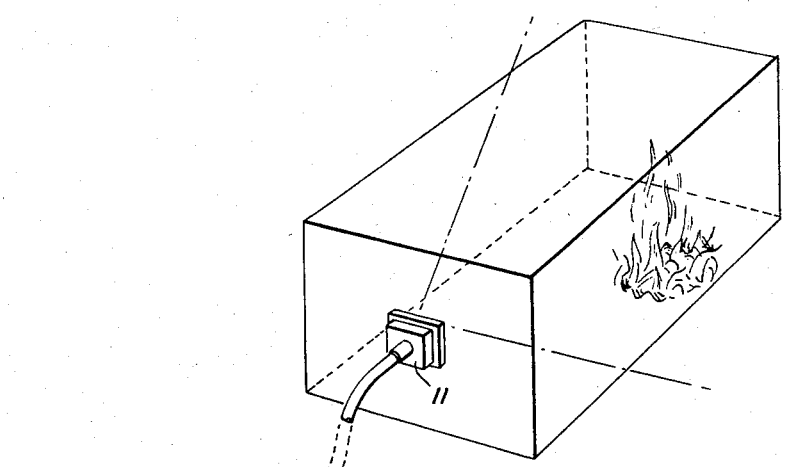
FIG. 2.
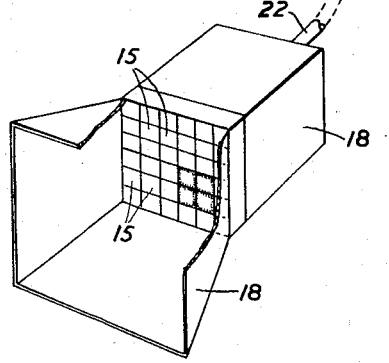
INVENTORS
LESLIE T. THURLBY
JACK B. COLLINS
BY *Mason and Mason*
ATTORNEYS Oct. 20, 1959   L. T. THURLBY ET AL   2,909,668
RADIATION DETECTION AND INDICATING DEVICES
Filed June 4, 1958   2 Sheets-Sheet 2

INVENTORS
LESLIE T. THURLBY
JACK B. COLLINS

BY Mason and Mason

ATTORNEYS

United States Patent Office 2,909,668
Patented Oct. 20, 1959

2,909,668

RADIATION DETECTION AND INDICATING DEVICES

Leslie T. Thurlby, Amersham, and Jack B. Collins, Isleworth, England, assignors of one-half to Graviner Manufacturing Company Limited, London, England, a British company Application June 4, 1958, Serial No. 739,896

Claims priority, application Great Britain June 14, 1957

7 Claims. (Cl. 250—213)

This invention relates to radiation detection and indicating devices.

The invention is particularly concerned with devices for detecting and indicating the existence of visible light radiation, although it is not limited to such use and may be used, for example, for the detection and indication of non-visible light radiation or heat radiation.

According to the present invention there is provided a radiation detection and indicating device comprising a number of radiation detection devices each arranged to receive radiation of a predetermined kind from a different part of an area or volume which is to be monitored for such radiation, a number of indicating devices, and means for electrically connecting each of said radiation detection devices to a respective one of said indicating devices, said indicating devices being located in proximity to one another and arranged relatively to one another in correspondence to the relationship of the parts of the area or volume monitored by the respective detection devices whereby the composite pattern provided by the indicating devices simulates the relative location of radiation in the area or volume being monitored.

The invention further provides a radiation detection and indicating device comprising a number of detection devices adapted to respond electrically to visible or near visible radiation and each arranged to monitor a different part of an area or volume which is to be monitored for said radiation, a number of electrically operated indicating devices, and means for electrically connecting each of said detection devices to a respective one of said indicating devices for effecting operation of the latter when said radiation is present in the part monitored by the respective detection device, said indicating devices being located adjacent one another and arranged relatively to one another in correspondence to the relationship of the parts of the area or volume monitored by the respective detection devices whereby the composite pattern provided by the indicating devices simulates the relative location of visible or near visible radiation in the area or volume being monitored.

One particular construction of the device comprises a number of photo-electric devices each arranged to monitor a different part of an area or volume which is to be monitored for visible or near-visible radiation, a number of electro-luminescent cells, and means for electrically connecting each of said photo-electric devices to a respective one of said electro-luminescent cells for effecting illumination of that cell when said radiation is present in the part monitored by the respective detection device, the brightness of such illumination being dependent upon the amount of radiation present, said electro-luminescent cells being located adjacent one another and arranged relatively to one another in correspondence to the relationship of the parts of the area or volume monitored by the respective detection devices whereby the composite pattern produced by illumination of the electro-luminescent cells simulates both the amount and location of said radiation in the area or volume being monitored.

One possible construction of a radiation detection and indicating device in accordance with the present invention will now be described, by way of example only, reference being made to the accompanying drawings in which:

Figure 1 shows a part-sectional view of this construction of the device;

Figure 2 shows diagrammatically how the device may be positioned in use for monitoring a space against the occurrence or undesired spread of flame;

Figure 3:
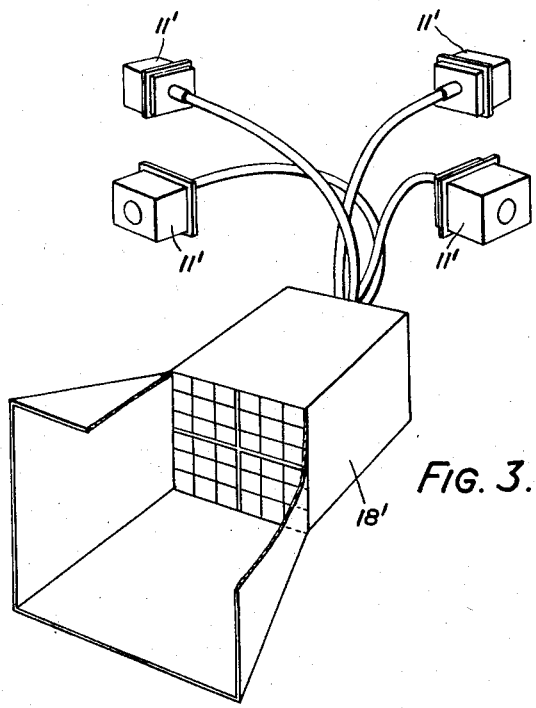
Figure 3 shows a development of the construction shown in Figure 1 in which a plurality of separate housings are provided for the detection devices.

The construction shown in Figure 1 is designed to monitor a volume for visible radiation, for example that originating from flames, and to indicate on the remotely situated indicating means the approximate location, extent and amount of any flames present in the monitored volume. To this end the detection means consists of thirty-six photo-electric devices 10 arranged in six rows of six devices each in a housing 11, only one device in each row being visible in Figure 1. In this particular construction the devices 10 are photo-conductive devices, for example cadmium sulphide crystals or lead sulphide. At one end of the housing, a wide angle lens 12 is mounted behind an aperture in a front plate 11a. The lens 12 is designed to focus radiation occurring within the field of view indicated by the broken lines 13 onto the plane in which lie the photo-sensitive surfaces of the thirty-six photo-electric devices 10.

One terminal of each of the photo-electric devices 10 is connected to a plug pin 14a projecting from an insulated base 11a of the housing 11 whilst the other terminal of each photo-electric device 10 is connected to a respective one of thirty-six plug pins 14b similarly projecting from the base (only six of the pins 14b being visible in Figure 1).

The indicating portion of the device is formed by thirty-six electro-luminescent cells 15, which like the photo-electric devices 10 are arranged in six rows of six cells each, only one cell in each row being visible in Figure 1. Each electro-luminescent cell 15 is in the form of a plate having electrodes on opposite faces, at least that face of the cell 15 which is on the viewed side of the indicating device being translucent.

The construction of each cell 15 is such that when an alternating potential of sufficient magnitude is applied between the two electrodes the cell luminesces and the luminescence can be seen through the translucent electrode. Thus, in one possible construction each cell 15 consists of a dielectric plate, the dielectric being a luminescent salt. Each cell 15 is mounted behind a protective transparent window 16 in a corresponding recess in an insulating base plate 17 which extends across a housing 18. The latter is provided with a viewing hood 18a to reduce the intensity of ambient light falling on the cells 15. The electrodes of each cell 15 are connected to pins 19 which project from the rear face of the insulating base plate 17.

Figure 4:
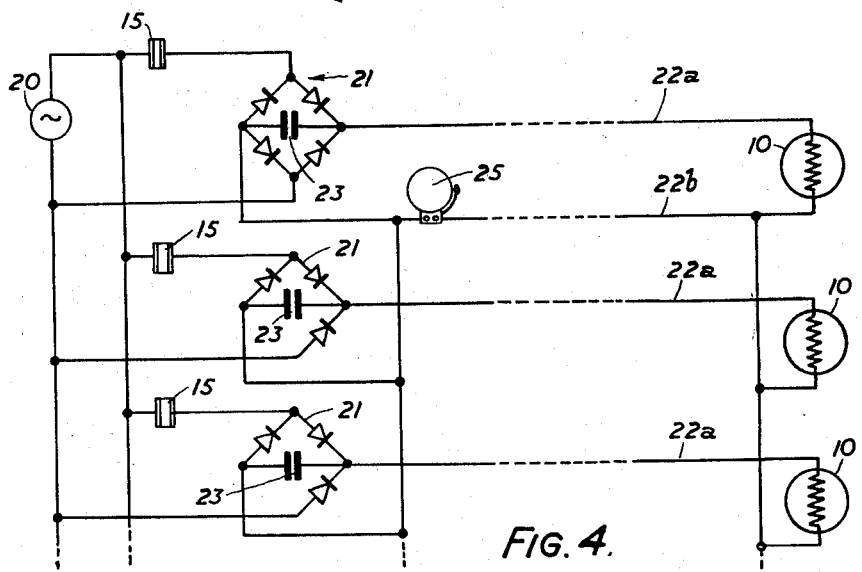
Figure 4 is a diagram of part of the electrical circuit for the Figure 1 construction of the device.

The photo-electric devices 10 and the electro-luminescent cells 15 are connected in circuit with an alternating current supply 20. In this particular construction, rectifying elements are incorporated in the circuit for a reason which will be explained hereafter. These rectifying elements are located in the rear of the housing 18. As shown in Figure 4, each electro-luminescent cell 15 is connected in series with the alternating current supply 20 across one diagonal of a rectifier bridge 21.

The other diagonal of the bridge 21 is connected to one end of a pair of electrical conductors 22a, 22b whose other end is connected across the photo-electric device 10, a smoothing capacitor 23 also being connected across this latter diagonal of the bridge 21. When a photo-electric device 10 is illuminated, the consequent flow of alternating current through the electro-luminescent cell 15 will be rectified by the rectifier bridge 21 so that the current through the conductors 22 will be uni-directional and smoothed by the smoothing capacitor 23. The circuits between each one of the electro-luminescent cells 15 and its associated photo-electric device 10 is similar, but as shown in Figure 4 the conductor 22b used for the return path from the photo-electric device 10 to the rectifier bridge 21 can be common to all the circuits, and this means that the rectifier element in the corresponding arm of the rectifier bridges 21 can be common to all the rectifier bridges 21. Thus, in addition to the single common rectifier element, only three other rectifier elements are required for each circuit and the number of separate conductors need be only one more than the total of photo-electric devices 10, namely thirty-six conductors 22a and one common return conductor 22b. As shown in Figure 1, the conductors 22a, 22b may be provided by a multi-core cable 22, the conductors 22a, 22b being connected between the rectifier elements in the rear of the housing 18 and the projecting ends of sockets 24a mounted in a socket member 24. The mouth of each socket 24a is adapted to receive one of the corresponding plug pins 14a, 14b. An electrically operated visual or audible alarm 25 is mounted on the housing 18 and is connected in the path of the common conductor 22b as shown in Figure 4 so that the alarm 25 is operated if any one of the detecting devices 10 is exposed to radiation.

The purpose of rectifying the alternating current from the supply 20, so that the current passing through the connecting cable is uni-directional, is to reduce "cross-talk" between different conductors 22a. Where the extent of any cross-talk will be negligible or not objectionable, the rectifying elements may be dispensed with and each detection device 10 connected in series with its associated electro-luminescent cell 15 directly across the supply 20.

If it is desired to avoid the use of multi-core cable, the channels between the respective photo-electric cells and their associated luminescent cells may be constituted by a single physical channel which is shared, for example, on a time division or other basis.

The electro-luminescent cells 15 are positioned in correspondence to the position of the photo-electric devices so that when a person's attention is drawn to the device by operation of the visible or audible alarm 25 the approximate location, extent and amount of the flames can be determined by observation of the cell or cells which are luminescent. This will be better understood by reference to Figure 2 which shows the detecting housing 11 mounted at one end of a space to be monitored with the indicating housing 18 located at some distance therefrom. Figure 2 illustrates how for flames having the location and extent indicated, some four of the cells 15 will be luminescent in that portion of the screen corresponding to the portion of the space in which the fire is located. Some indication of the intensity of the fire will also be given by the intensity of luminescence of the cells 15. Moreover, the luminescence will tend to flicker in a similar manner to the flicker of the flame.

It will be appreciated that the device is useful not only in those cases in which flame should not normally be present and in which it is desired to obtain an indication should flames occur, but it is also particularly useful in those cases in which flame should normally be present to a limited extent but in which it is desired to obtain an indication if the flame becomes out of hand or grows unduly.

Figure 3 indicates a modified construction in which the detecting portion of the device has four separate housings 11' similar to the housing 11 shown in Figure 1, but each containing only nine photo-electric devices (not visible in Figure 3) arranged in three rows of three devices each. Of course, as before, the number of devices indicated is purely by way of example. The four housings 11' can then have the lens aperture facing in any desired direction, and as indicated in Figure 3 the housings 11' are arranged relatively to one another to give an "all-round" view. By appropriate choice of the wide-angle lenses, the field of view of each of the housings 11' can be made overlapping. At the indicating end of the device the four sets of electro-luminescent cells corresponding to the four sets of detectors are arranged in a common housing 18' as before so that they can all be viewed together.

It should be understood that the invention is not limited to the detection of visible radiation, but by the use of appropriate detecting devices non-visible light radiation or heat radiation may be detected, and to this end photo-electric devices having maximum sensitivity at appropriate frequencies may be used or other radiation responsive devices such as thermocouples, bolometers or thermopiles may be used. Moreover, photo-emissive or photo-voltaic cells may be used instead of photo-conductive cells.

At the indicating end, other indicating means than electro-luminescent cells may be used, for example indicating means operated by electronic or electro-magnetic relays may be used. Thus, the indicating screen may consist of a number of elements which normally present a white surface but in the event of operation of the relay a red surface is moved into the viewing position. The location and number of red surfaces exposed then serves to indicate the approximate location and extent of radiation within the space being monitored.

As an alternative to the use of a lens to focus a field of view onto the detection devices, separate optical systems may be used for determining the range of view of one or more of the detection means. Thus, as an extreme case each detection means may have its own optical system in the form of a lens, mirror, light guide, or screening means to determine the particular range of view of the detection device.

It should be noted that where rectifier bridges are employed but it is undesirable to use one rectifier common to all the bridges, a common return conductor will not be employed and if a visual or audible alarm is provided it should be connected in a common part of the alternating current circuit.

We claim:

1. Apparatus for monitoring a volume for fire, comprising a number of photo-conductive elements, optical means for limiting the radiation received by each element to a different part of said volume respectively, a number of electro-luminescent cells, said cells being equal in number to the number of said photo-conductive elements, a source of alternating current, a multi-core cable having a plurality of mutually insulated conductors, a plurality of current rectifying means, said rectifying means being located at the same end of the cable as the electro-luminescent cells, each electro-luminescent cell being electrically connected to a respective one of said current rectifying means and to said source of alternating current and each photo-conductive element being electrically connected by a respective one of said conductors in current controlling circuit with a respective one of said current rectifying means, whereby the conductivity of each photo-conductive element controls the alternating current flow through its associated electro-luminescent cell, said electro-luminescent cells being mounted adjacent one another and positioned relatively to one another in a pattern corresponding to the relationship of the parts of the volume monitored by the respective photo-conductive elements, whereby the composite pattern produced by the illumination of the electro-luminescent cells simulates both the amount and the location of radiation in the volume being monitored.

2. Apparatus according to claim 1, wherein said optical means comprises a wide angle lens which focusses a field of view onto said photo-conductive elements.

3. Apparatus according to claim 1, wherein a single common conductor is used for the return path from each photo-conductive element to said rectifying means.

4. Apparatus according to claim 3, further comprising an electrically operated indicating device connected in circuit with said common conductor whereby said indicating device will be operated by current flow through any one photo-conductive element.

5. Apparatus for monitoring a volume for radiation of wavelengths lying within the range of wavelengths comprising visible and near-visible wavelengths, comprising, in combination, a plurality of photo-conductive devices, each of said devices being responsive to radiation of said wavelengths which occurs in a different part of said volume respectively, a plurality of electro-luminescent cells, said cells being equal in number to the number of said photo-conductive devices, a source of alternating electrical potential, a plurality of mutually insulated electrical conductors, a plurality of current rectifiers, said rectifiers being located at the end of said conductors adjacent said electro-luminescent cells and remote from said photo-conductive devices, each rectifier having input terminals for connecting the rectifier in series with both a respective one of said electro-luminescent cells and said alternating potential source, each rectifier further having output terminals connected by one of said conductors to a respective one of said photo-conductive devices whereby the alternating current potential across each electro-luminescent cell is determined by the conductivity of the photo-conductive device connected to the same rectifier as the electro-luminescent cell and a cell is illuminated when said radiation is present in the part of the volume monitored by its respective photo-conductive device, said electro-luminescent cells being mounted adjacent one another and located relatively to one another in a pattern corresponding to the relationship of the parts of the volume monitored by the respective photo-conductive devices.

6. Apparatus according to claim 5, wherein one of said electrical conductors is a common return path from each photo-conductive device to its associated rectifier.

7. Apparatus according to claim 6, further comprising an electrically operated indicating device which is electrically connected in said common return path.

References Cited in the file of this patent

UNITED STATES PATENTS

| | | |
|---|---|---|
| 1,072,152 | Ocampo | Sept. 2, 1913 |
| 1,880,289 | Sukumlyn | Oct. 4, 1932 |
| 1,907,124 | Ruben | May 2, 1933 |
| 2,120,765 | Orvin | June 14, 1938 |
| 2,327,222 | Sell | Aug. 17, 1943 |
| 2,640,880 | Aigrain et al. | June 2, 1953 |
| 2,734,149 | Rabinow | Feb. 7, 1956 |
| 2,773,992 | Ullery | Dec. 11, 1956 |